(12) United States Patent
Rommel

(10) Patent No.: US 6,609,801 B2
(45) Date of Patent: Aug. 26, 2003

(54) INTERIOR REARVIEW MIRROR FOR VEHICLES, IN PARTICULAR, MOTOR VEHICLES

(75) Inventor: Bernd Rommel, Fellbach-Schmiden (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 7 days.

(21) Appl. No.: 09/852,311

(22) Filed: May 9, 2001

(65) Prior Publication Data

US 2001/0046095 A1 Nov. 29, 2001

(30) Foreign Application Priority Data

May 24, 2000 (DE) .......................................... 200 09 357

(51) Int. Cl.⁷ .............................. G02B 7/182; B60R 1/04
(52) U.S. Cl. ....................................... 359/872; 248/478
(58) Field of Search ................................ 359/871, 872; 248/477, 478, 479, 481, 482, 483, 549

(56) References Cited

U.S. PATENT DOCUMENTS

| 4,645,316 | A | * | 2/1987 | Ohyama |
| 4,934,802 | A | * | 6/1990 | Fluharty et al. |
| 5,377,948 | A | * | 1/1995 | Suman et al. |
| 5,582,383 | A | * | 12/1996 | Mertens et al. |
| 5,680,263 | A | * | 10/1997 | Zimmermann et al. |
| 5,931,440 | A | * | 8/1999 | Miller |
| 5,966,255 | A | * | 10/1999 | Mochizuki et al. |
| 6,068,380 | A | * | 5/2000 | Lynn et al. |
| 6,203,161 | B1 | * | 3/2001 | Busch et al. |
| 6,299,319 | B1 | * | 10/2001 | Mertens et al. |
| 6,315,421 | B1 | * | 11/2001 | Apfelbeck et al. |

FOREIGN PATENT DOCUMENTS

| DE | 2410388 | * | 9/1975 |
| DE | 4320488 | * | 7/1994 |

\* cited by examiner

Primary Examiner—Ricky D. Shafer
(74) Attorney, Agent, or Firm—Gudrun E. Huckett

(57) ABSTRACT

An interior rearview mirror has a holding part and a mirror base connected by a snap connection to the holding part. A covering in the form of a sleeve encloses the mirror base and is configured to be received in a cover provided in the vehicle. The mirror base is adjustable relative to the holding part. The snap connection has a spring snap-connected to the holding part, wherein the spring has a coupling member and the mirror base is fixedly connected to the coupling member in a mounted position of the mirror base.

27 Claims, 5 Drawing Sheets

INTERIOR REARVIEW MIRROR FOR VEHICLES, IN PARTICULAR, MOTOR VEHICLES

BACKGROUND OF THE INVENTION

1. Field of the Invention

The invention relates to an interior rearview mirror for vehicles, in particular, motor vehicles, comprising a mirror base which is enclosed by a covering which is positioned in a receiving opening of a cover provided in the vehicle, and comprising a holding part on which the mirror base is secured by being snap-connected.

2. Description of the Related Art

Such interior rearview mirrors are screwed with their mirror base onto a holding plate which is fastened on the windshield of the vehicle. The mirror base which is surrounded by a sleeve projects in this connection into a slot opening on the edge of the cover which is provided on the vehicle roof. Often, the mirror base with its sleeve is not properly aligned relative to the cover so that a non-uniform gap is formed between the sleeve and the edge of the cover.

SUMMARY OF THE INVENTION

It is an object of the present invention to configure the interior rearview mirror according to the invention such that the mirror base, after mounting, is aligned properly relative to the cover.

In accordance with the present invention, this is achieved in that the mirror base is embodied to be adjustable relative to the holding part.

As a result of the adjustability of the mirror base relative to the holding part in accordance with the invention, it is possible in a simple way to align the interior rearview mirror such that between the mirror base or its covering and the edge of the receiving opening of the cover a gap of uniform width remains.

DESCRIPTION OF THE PREFERRED EMBODIMENTS

Figure 1:
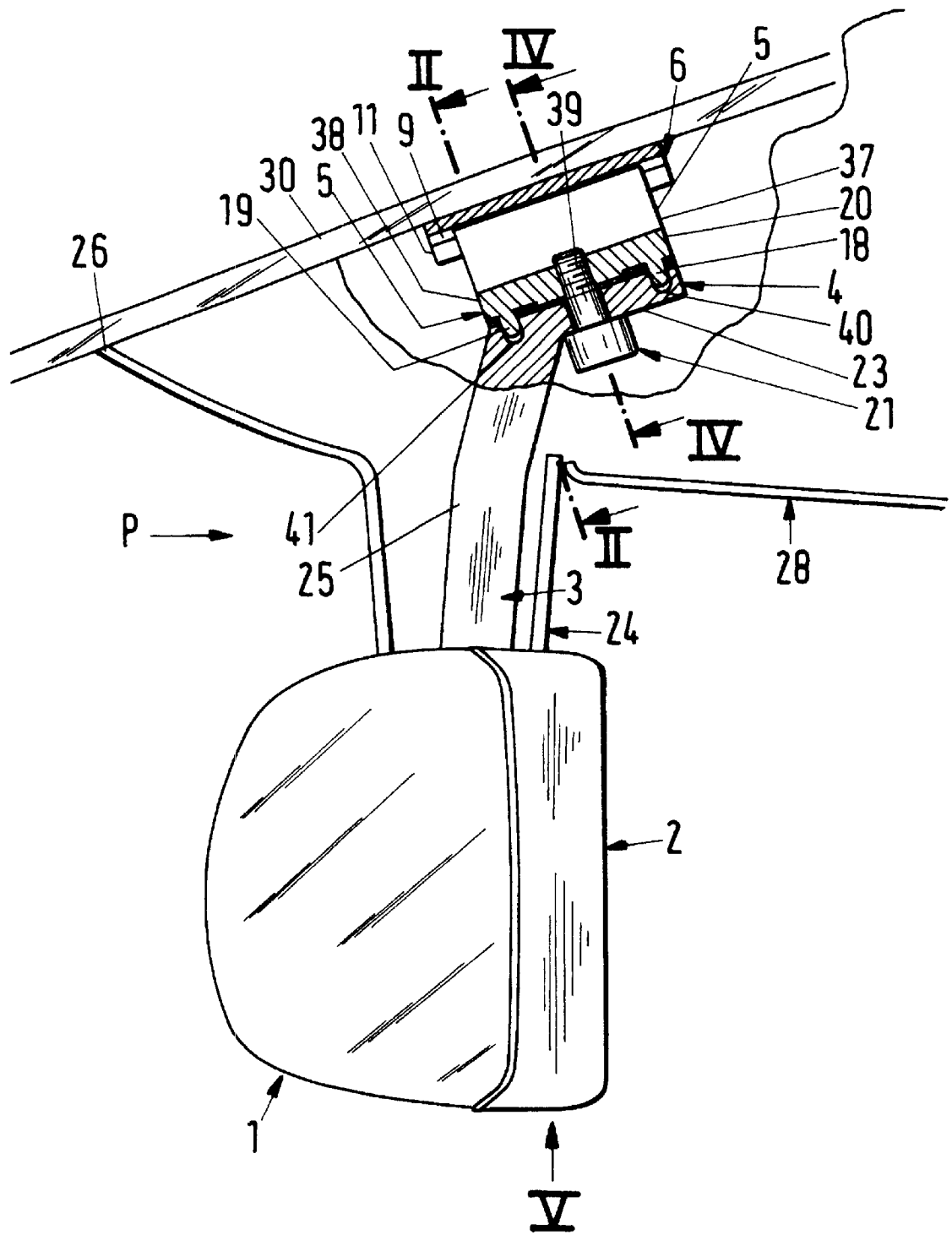
FIG. 1 shows an interior rearview mirror according to the invention which is secured with its mirror base via a holder on the windshield of the vehicle, shown partially in an end view and partially in axial section.

The interior rearview mirror 1 illustrated in FIGS. 1 through 5 has a mirror head 2 which is fastened via a mirror base 3 on the inner side of the windshield 30 of a vehicle (not illustrated in detail). For this purpose, the free end of the mirror base 3 is formed as a connector 4 of a U-shaped cross-section. It is connected by a release spring 5 with a holder in the form of a holding plate 6 fastened on the windshield 30 which holding plate has advantageously a rectangular contour and is preferably glued to the windshield 30. The two oppositely positioned plate edges 7, 8 of the holding plate 6 are thicker in the downward direction and have at their facing inner sides cutouts in the form of shoulders 9, 10 into which the spring 5 projects with free spring ends 11, 12 projecting outwardly in a V-shape. They are supported with initial tension of the spring 5 on planar, slantedly inwardly extending and downwardly converging shoulder surfaces 13, 14. The holding part must not be fastened to the windshield 30 but can instead be secured on the roof of the vehicle.

Figure 4:
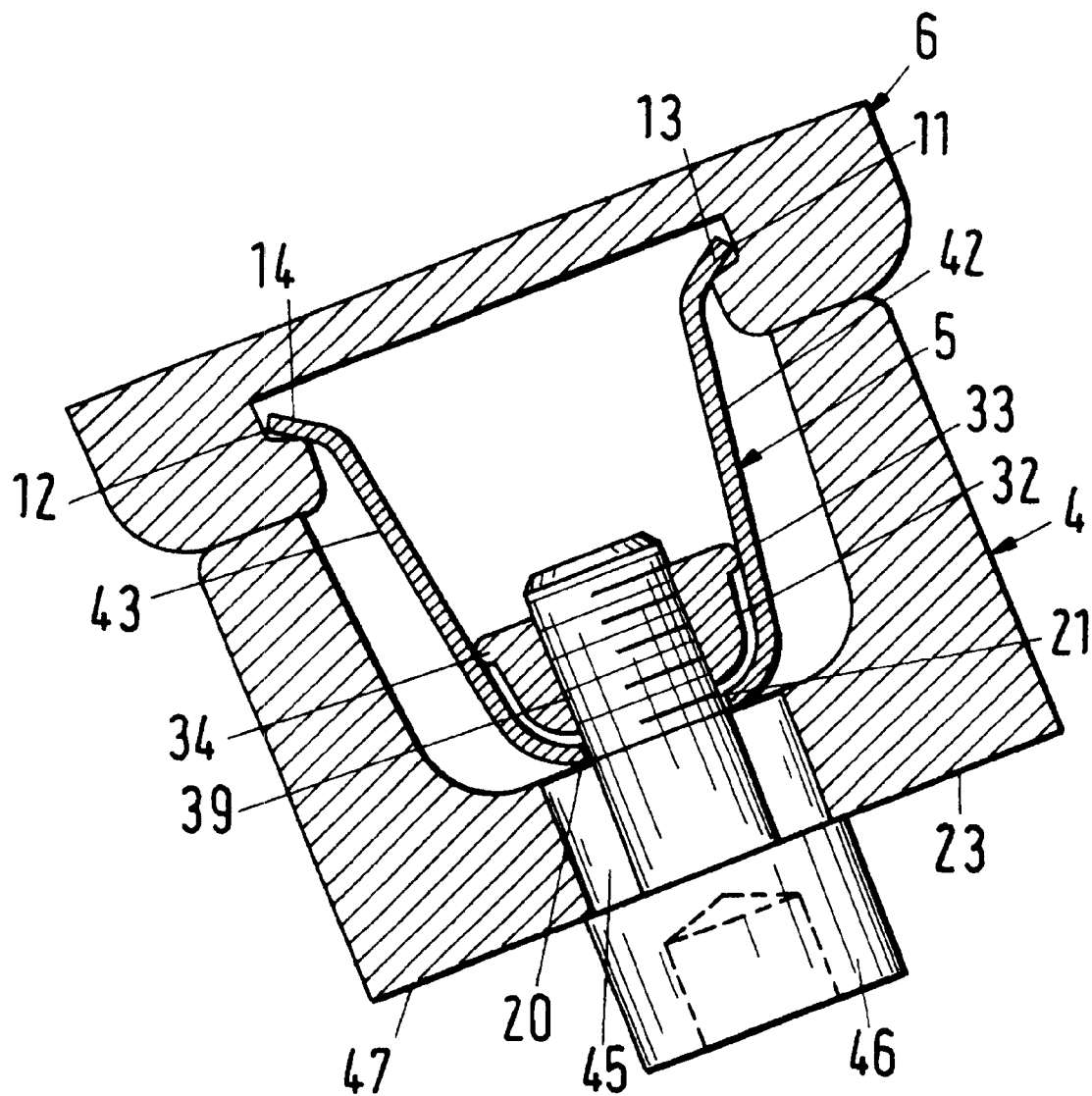
FIG. 4 is a section along the line IV—IV of FIG. 1.

The spring 5 is preferably bent from an elongate rectangular spring sheet metal into a U-shape and has at its bottom 15 two insertion openings 17 positioned at a spacing from one another for receiving pin-shaped projections 18, 19 of a coupling member in the form of a pressure member 32. At half its width the spring has a further central opening 20 for a fastener 21 (FIGS. 1, 4).

Figure 2:
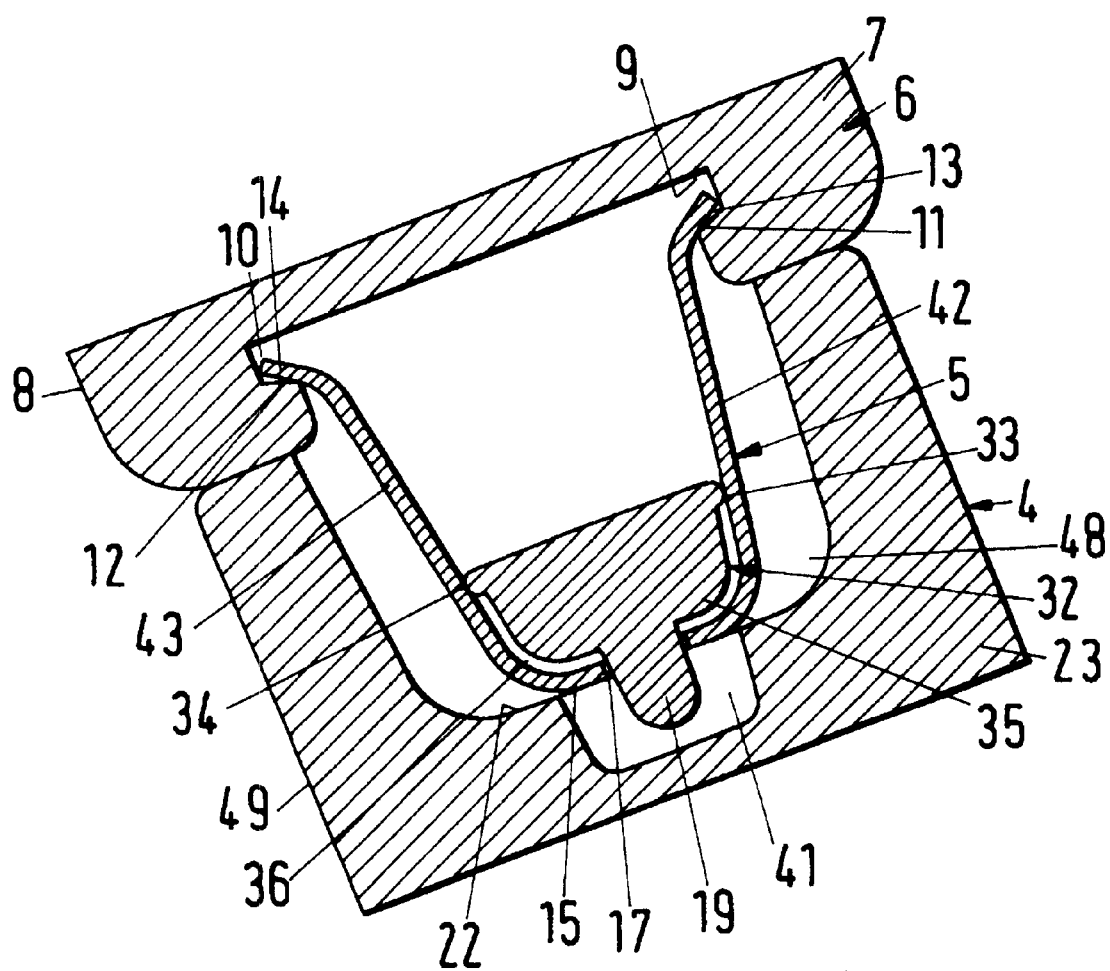
FIG. 2 shows the holder according to FIG. 1 in a section along the line II—II of FIG. 1.

The spring 5 extends over the entire length of the connector 4 and rests with its bottom 15 against the inner side 22 of the bottom 23 of the connector 4 (FIGS. 1, 2).

Figure 5:
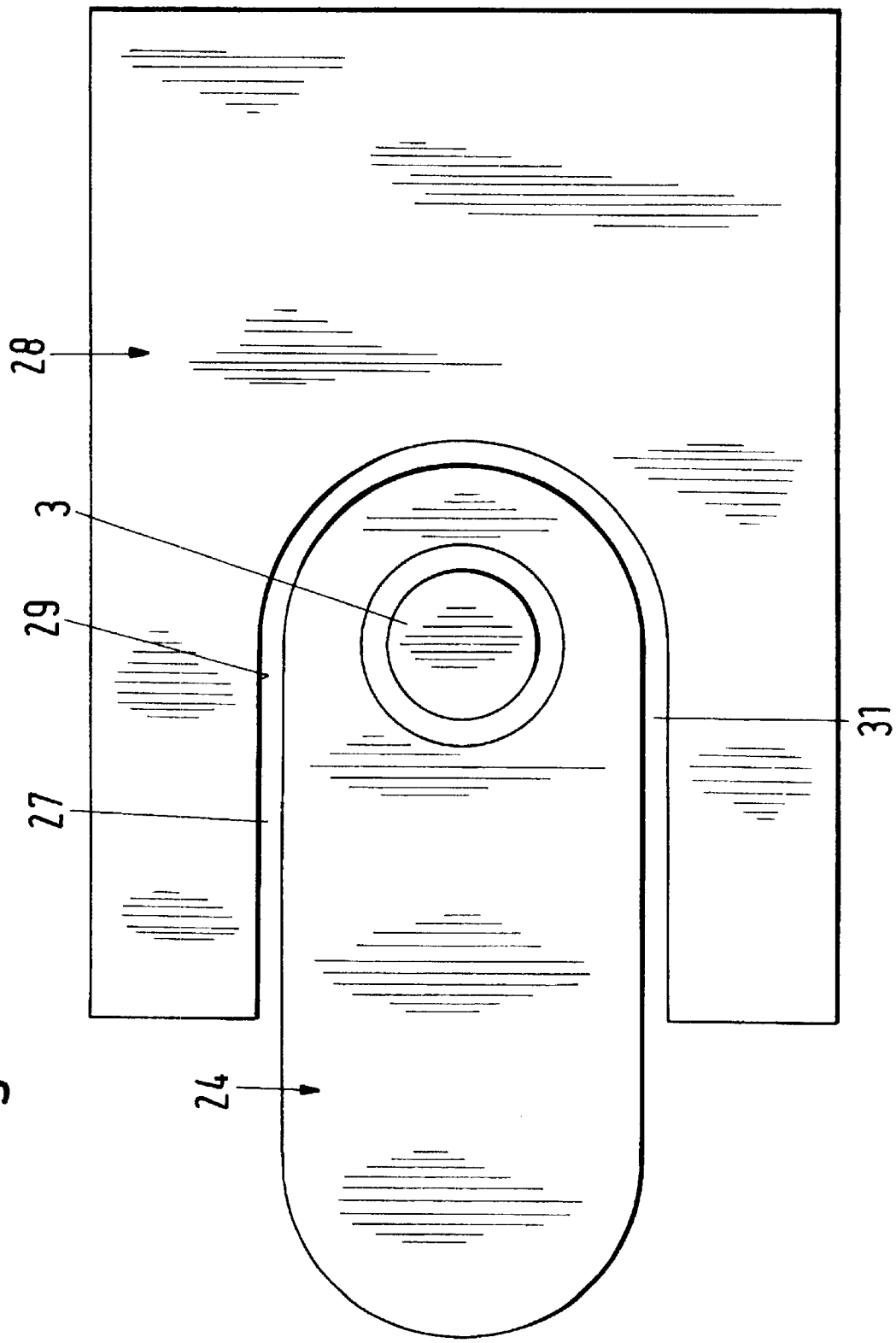
FIG. 5 is a view in the direction of arrow V in FIG. 1, without the mirror head of the interior rearview mirror.

As illustrated in FIGS. 1 and 5, the mirror base 3 is surrounded with play by a covering in the form of a sleeve 24 which covers the free space between a cover 28 provided on the roof of the interior of the vehicle and the windshield 30.

The sleeve 24 widens in a funnel shape upwardly in the direction toward the windshield 30 (FIG. 1). The mirror base 3 is angled at a spacing from the mirror head 2 at a large obtuse angle. At the level of the angled portion 25, the sleeve 24 widens in the direction toward the windshield 30 which it adjoins with its free end 26 at an acute angle. As illustrated in FIGS. 1 and 5, the sleeve 24 projects into a U-shaped slot or cutout 27 opening at the edge of the cover 28 which is fastened on the roof of the vehicle. When the inner rearview mirror 1 is properly aligned and mounted, the gap 31 formed between the edge of the cutout 27 of the cover 28 and the sleeve 24 has the same width over its entire length.

In order to be able to adjust an identical or uniform gap width in a simple way, the interior rearview mirror, when being mounted, can be precisely aligned relative to the windshield 30 or the holding plate 6 fastened thereto. For this purpose, the connector 4 of the mirror base 3 is adjustable relative to the holding plate 6 or the pressure member 32.

The coupling member or pressure member 32 is an elongate insertion part which has approximately a trapezoidal cross-section with a narrow side and a wide side. The upper longitudinal edges 33, 34 of the wide side are widened like a bead in the outward direction. The lower longitudinal edges 35, 36 are circularly rounded. As illustrated in FIG. 1, the pin-shaped projections 18, 19 of the pressure member 32 are provided on the narrow side (see FIGS. 2, 3) and are spaced at a small spacing from its planar end faces 37, 38 (FIG. 1). The pressure member 32 has moreover a receptacle in the form of a central threaded bore 39 (FIG. 4) which is aligned with a through opening 45 in the bottom 23 of the connector 4 when the mirror base is adjusted. The fastener 21 projects with play through the through opening 45 and is threaded into the threaded bore 39. The fastener 21 which is embodied as a screw is supported with its head 46 on the underside 47 of the connector 4 and pulls the pressure member 32 in the downward direction. The bead-like widened longitudinal edges 33, 34 of the pressure member 32 press onto the two spring legs 42, 43 of the spring 5 and spread them apart. Moreover, the pressure member 32 with its insertion members or projections 18, 19 is securely pulled into the depressions or insertion openings 40, 41 provided in the inner side 22 of the bottom 23 of the connector 4. The height of the insertion members (projections) 18, 19 is advantageously only slightly smaller than the height of the pressure member 32 which corresponds approximately to one third of the height of the spring 5. The insertion openings or depressions 40, 41 have an elongate rectangular contour and extend transversely, preferably perpendicularly, to the longitudinal direction of the connector 4. In this direction, the length of the depressions 40, 41 is at least twice as large as the thickness of the insertion members (projections) 18, 19. They can be formed of a truncated cone shape or, for example, also cylindrically, and have advantageously a round cross-section. The free ends of the projections 18, 19 are rounded. The pressure member 32 is supported in the mounted position with its bead-shaped, outwardly projecting longitudinal edges 33 and 34 on the spring legs 42, 43 of the spring 5 and maintain its initial tension.

When during mounting of the interior rearview mirror 1 the gap 31 between the cover 28 and the sleeve 24 has a constant width (FIG. 5), an adjustment of the mirror base 3 relative to the holding plate 6 is not required. In the embodiment it is assumed that the constant width is present when the connector 4 is symmetrically positioned relative to the holding plate 6 (FIG. 2). The projections 18, 19 of the pressure member 32 are then positioned at half the length of the depressions 40, 41 of the connector 4. Its spring legs 48, 49 are then positioned areally with their end faces on the end faces of the thicker edges 7, 8 of the holding plate 6.

When, after mounting, the gap 31 does not have, over its length, a constant width between the cover 28 and the sleeve 24, it is required to move the connector 4 of the mirror base 3 relative to the holding plate 6 before tightening the fastener 21.

Figure 3:
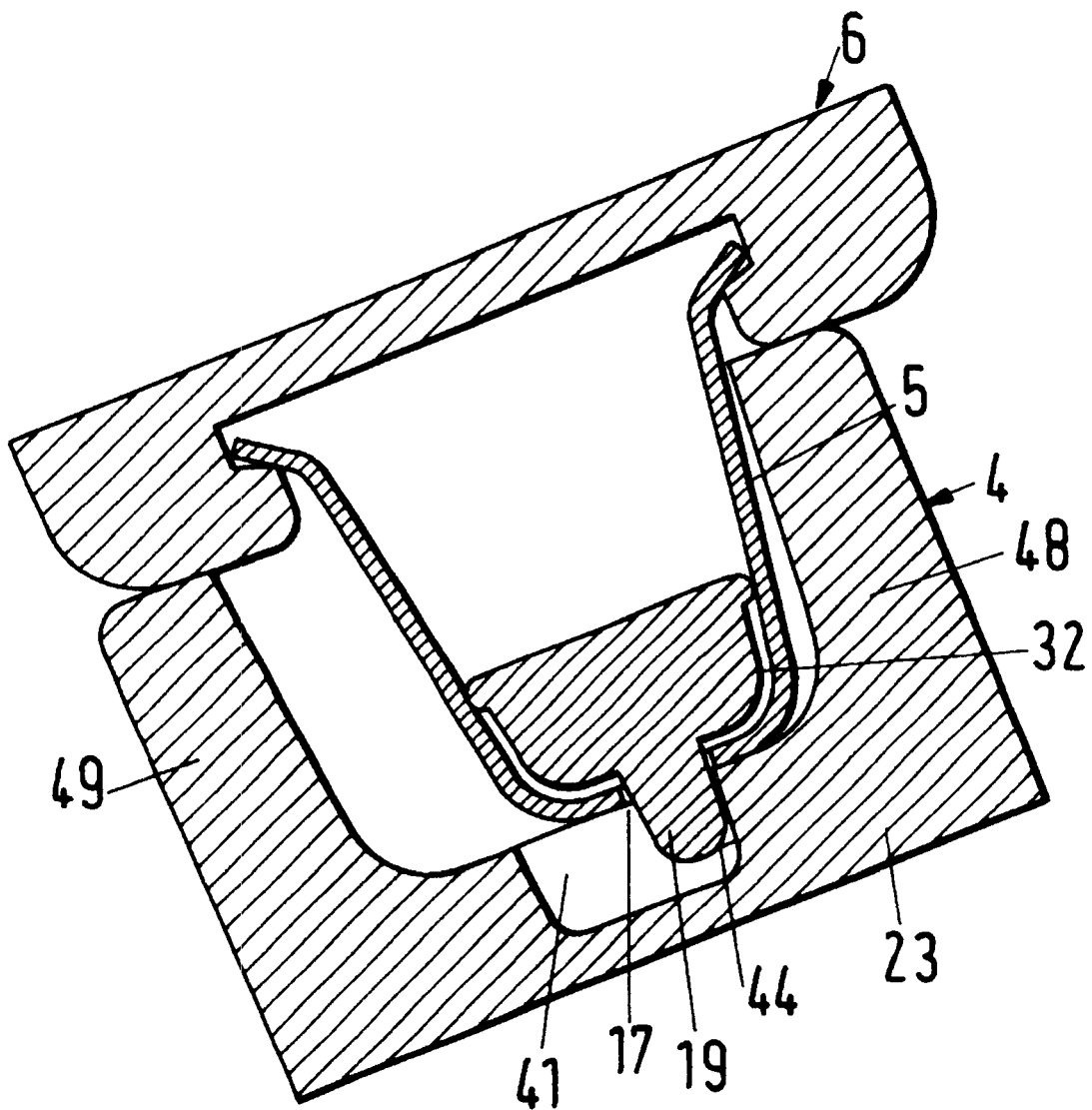
FIG. 3 is an illustration corresponding to FIG. 2 but in a maximally displaced position of the mirror base.

FIG. 3 shows the situation in which the connector 4 has been moved maximally in one transverse direction relative to the holding plate 6 as well as the spring 5 and the pressure member 32. In this position the projections 18, 19 of the pressure member 32 rest on one sidewall 44 of the depressions 40, 41. The connector 4 is moved relative to the holding plate 6 to such an extent that the two legs 48, 49 of the connector 4 rest with their end faces only partially on the end faces of the longitudinal edges 7, 8 of the holding plate 6.

The connector 4 of the mirror base 3 can also be moved in the other transverse direction. The connector 4 of the mirror base 3 is moved relative to the holding plate 6 to such an extent that the gap 31 between the cover 28 and the sleeve 24 supported on the mirror base 3 has a constant width over its length. This adjustment can be carried out sensitively and continuously and can be performed quickly. As soon as the connector 4 is aligned, the fastener 21 is tightened so that the interior rearview mirror 1 is secured reliably on the holding plate 6. The through opening 45 of the connector 4 is so large that the required adjustments of the mirror base 3 relative to the holding plate 6 are possible despite the fastener 21.

The function of the spring 5 and the connection of the spring with the holding plate 6 are not impaired or affected by this adjustment possibility. It is thus ensured that the mirror base 3 with the mirror head 2 and sleeve 24 will be released when the interior rearview mirror 1 experiences an impact so that the risk of injury is avoided.

While specific embodiments of the invention have been shown and described in detail to illustrate the inventive principles, it will be understood that the invention may be embodied otherwise without departing from such principles.

What is claimed is:

1. An interior rearview mirror comprising:
    a holding part (6);
    a mirror base (3) connected by a snap connection to said holding part (6);
    a covering (24) enclosing said mirror base (3) and configured to be received in a cover (28) provided in a vehicle;
    wherein said mirror base (3) is configured to be adjustable relative to said holding part (6); and
    wherein said snap connection comprises a spring (5) snap-connected to said holding part (6), wherein said spring (5) comprises a coupling member (32) and wherein said mirror base (3) is fixedly connected to said coupling member (32) in a mounted position of said mirror base (3).

2. The interior rearview mirror according to claim 1, wherein said coupling member (32) is a pressure member (32) acting on said spring (5).

3. The interior rearview mirror according to claim 1, wherein said coupling member (32) has one or more insertion members (18, 19).

4. The interior rearview mirror according to claim 1, wherein said coupling member has two insertion members (18, 19) positioned spaced apart to one another in a longitudinal direction of said coupling member (32).

5. The interior rearview mirror according to claim 4, wherein said two insertion members (18, 19) are pins having a truncated cone shape.

6. The interior rearview mirror according to claim 4, wherein said two insertion members (18, 19) have free ends that are rounded.

7. The interior rearview mirror according to claim 4, wherein said mirror base (3) has a connector (4) having at least one insertion opening (40, 41), wherein said two insertion members (18, 19) project into said at least one insertion opening (40, 41).

8. The interior rearview mirror according to claim 7, wherein said two insertion members (18, 19) have a cross-sectional width that is smaller than a length of said at least one insertion opening (40, 41) transverse to a longitudinal direction of said connector (4).

9. The interior rearview mirror according to claim 8, wherein said length of said at least one insertion opening (40, 41) is at least twice large as a widest portion of said cross-sectional width of said two insertion members (18, 19).

10. The interior rearview mirror according to claim 4, wherein said at least one insertion opening (40, 41) widens in a direction toward said holding part (6).

11. The interior rearview mirror according to claim 4, further comprising a fastener (21), wherein said coupling member (32) has a receptacle (39) located between said two insertion members (18, 19) and configured to receive said fastener (21).

12. The interior rearview mirror according to claim 11, wherein said fastener (21) is a screw.

13. The interior rearview mirror according to claim 11, wherein said receptacle (39) is a threaded bore.

14. The interior rearview mirror according to claim 11, wherein said mirror base (3) has a connector (4) with a through opening (45), wherein said receptacle (39) is aligned with said through opening (45).

15. The interior rearview mirror according to claim 4, wherein said coupling member (32) has a substantially trapezoidal cross-section.

16. The interior rearview mirror according to claim 15, wherein coupling member (32) has a wide side and a narrow side wherein said two insertion members (18, 19) are connected to said narrow side and project away from said narrow side.

17. The interior rearview mirror according to claim 16, wherein said wide side has bead-shaped longitudinal edges (33, 34) projecting outwardly away from said coupling member (32).

18. The interior rearview mirror according to claim 1, wherein said spring (5) has spring legs (42, 43) with facing inner sides and wherein said coupling member (32) has edges (33, 34) resting against said inner sides of said spring legs (42, 43).

19. The interior rearview mirror according to claim 1, wherein said spring (5) has a U-shaped cross-section.

20. The interior rearview mirror according to claim 19, wherein said spring (5) has spring legs (42, 43) diverging in a direction of free spring ends (11, 12) of said spring legs (42,43).

21. The interior rearview mirror according to claim 20, wherein said free spring ends (11,12) of said spring legs (42, 43) are bent away from one another at an acute angle relative to said spring legs (42, 43).

22. The interior rearview mirror according to claim 21, wherein said free spring ends (11, 12) are supported on said holding part (6).

23. The interior rearview mirror according to claim 22, wherein said holding part (6) has shoulders (9, 10), wherein said free spring ends (11, 12) rest against said shoulders (9, 10).

24. The interior rearview mirror according to claim 1, wherein said mirror base (3) has a connector (4) configured to receive said coupling member (32), wherein said spring (5) has substantially the same length as said connector (4).

25. The interior rearview mirror according to claim 24, wherein said coupling member (32) has substantially the same length as said connector (4) and said spring (5).

26. The interior rearview mirror according to claim 1, wherein said coupling member (32) has substantially the same length as said spring (5).

27. The interior rearview mirror according to claim 1, wherein said mirror base (3) has a connector (4) configured to receive said coupling member (32), wherein said coupling member (32) has substantially the same length as said connector (4).

\* \* \* \* \*